United States Patent
Lawson et al.

(10) Patent No.: US 11,629,642 B2
(45) Date of Patent: Apr. 18, 2023

(54) SYSTEM AND METHODS FOR IGNITING AND OPERATING A GAS TURBINE ENGINE WITH ALTERNATIVE FUELS

(71) Applicant: General Electric Company, Schenectady, NY (US)

(72) Inventors: William James Lawson, Niskayuna, NY (US); Keegan Saunders O'Donnell, Greenville, SC (US); Geoffrey D. Myers, Simpsonville, SC (US); Paul Burchell Glaser, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 114 days.

(21) Appl. No.: 16/723,161

(22) Filed: Dec. 20, 2019

(65) Prior Publication Data
US 2021/0189965 A1    Jun. 24, 2021

(51) Int. Cl.
| | | |
|---|---|---|
| *F02C 7/224* | (2006.01) | |
| *F01K 21/04* | (2006.01) | |
| *F02C 3/30* | (2006.01) | |
| *F02C 3/04* | (2006.01) | |
| *F02C 9/40* | (2006.01) | |
| *F23R 3/34* | (2006.01) | |

(52) U.S. Cl.
CPC .............. *F02C 7/224* (2013.01); *F02C 3/30* (2013.01); *F01K 21/047* (2013.01); *F02C 3/04* (2013.01); *F02C 9/40* (2013.01); *F05D 2220/323* (2013.01); *F05D 2220/75* (2013.01); *F05D 2240/35* (2013.01); *F05D 2270/303* (2013.01); *F23R 3/346* (2013.01)

(58) Field of Classification Search
CPC .. F01K 21/047; F02C 3/30; F02C 7/22; F02C 7/224; F02C 9/40; F05D 2220/75; F05D 2240/36; F23R 3/28; F23R 3/30; F23R 3/32; F23R 3/36
See application file for complete search history.

(56) References Cited

U.S. PATENT DOCUMENTS

| | | | |
|---|---|---|---|
| 5,511,309 A | 4/1996 | Beabout | |
| 5,617,716 A * | 4/1997 | Schreiber | ................. F02C 3/30 |
| | | | 60/39.182 |
| 5,669,759 A | 9/1997 | Beabout | |
| 6,105,370 A * | 8/2000 | Weber | ....................... F02C 7/08 |
| | | | 60/733 |
| 6,435,814 B1 | 8/2002 | Yu et al. | |
| (Continued) | | | |

OTHER PUBLICATIONS

Extended European Search Report for Patent Application EP 20211967.3 dated Apr. 3, 2021; 6 pp.

*Primary Examiner* — Scott J Walthour
(74) *Attorney, Agent, or Firm* — Armstrong Teasdale LLP (57) ABSTRACT

A power generation system includes a combustion system, a liquid supply system, and a vapor supply system. The combustion system is configured to generate power by combusting an alternative fuel. The liquid supply system is configured to channel a liquid alternative fuel to the combustion system. The vapor supply system is configured to channel a vapor alternative fuel to the combustion system. The combustion system is ignited by combusting the liquid alternative fuel from the liquid supply system and is operated by combusting the vapor alternative fuel from the vapor supply system.

18 Claims, 7 Drawing Sheets

(56) References Cited

U.S. PATENT DOCUMENTS

| | | | |
|---|---|---|---|
| 6,939,392 B2 * | 9/2005 | Huang | B01D 65/08 |
| | | | 96/6 |
| 6,955,522 B2 | 10/2005 | Cunha et al. | |
| 7,303,372 B2 | 12/2007 | West et al. | |
| 7,568,882 B2 | 8/2009 | Brittingham et al. | |
| 7,654,073 B2 | 2/2010 | Primlani | |
| 7,827,794 B1 | 11/2010 | Pronske et al. | |
| 8,100,093 B2 | 1/2012 | Morgenstern | |
| 9,151,173 B2 | 10/2015 | Maldonado | |
| 9,289,826 B2 | 3/2016 | Morris et al. | |
| 2010/0000225 A1 | 1/2010 | Corbett | |
| 2011/0219780 A1 | 9/2011 | Prabhu | |
| 2013/0186057 A1 * | 7/2013 | Shanmugam | F02C 3/20 |
| | | | 60/39.463 |
| 2013/0219900 A1 * | 8/2013 | Hirata | F23R 3/30 |
| | | | 60/740 |
| 2014/0318134 A1 | 10/2014 | Popovic | |
| 2016/0076461 A1 * | 3/2016 | Kawai | B64D 37/30 |
| | | | 60/772 |
| 2016/0090913 A1 * | 3/2016 | Taguchi | F02C 7/08 |
| | | | 60/734 |

* cited by examiner

SYSTEM AND METHODS FOR IGNITING AND OPERATING A GAS TURBINE ENGINE WITH ALTERNATIVE FUELS

BACKGROUND

The field of the disclosure relates generally to gas turbine engines and, more specifically, to system and methods for igniting and operating gas turbine engines using alternative fuels.

In at least some known rotary machines, energy is extracted from the combustion of alternative fuels such as bio-diesels, alcohol based fuels (methanol, ethanol, etc.), bio-alcohols, vegetable oils, and/or other biomass fuels. Alternative fuels may be cheaper, more readily available, and may be used for carbon offsets in certain jurisdictions. Additionally, combusting alternative fuels may reduce emissions and may increase an operating range of the rotary machine because a boiling point of the alternative fuel may be lower than a boiling point of a conventional fuel.

However, rotary machines that combust alternative fuels are typically ignited and started with a conventional fuel because alternative fuels are more volatile than conventional fuels. Specifically, because at least some known alternative fuels evaporate at lower temperatures than conventional fuels, rotary machines that combust alternative fuels are first ignited on a liquid conventional fuel, and the rotary machine is transferred to combusting alternative fuels after ignition. It would therefore be desirable to ignite and operate the gas turbine engine using alternative fuels.

BRIEF DESCRIPTION

In one aspect, a power generation system is provided. The power generation system includes a combustion system, a liquid supply system, and a vapor supply system. The combustion system is configured to generate power by combusting an alternative fuel. The liquid supply system is configured to channel a liquid alternative fuel to the combustion system. The vapor supply system is configured to channel a vapor alternative fuel to the combustion system. The combustion system is ignited by combusting the liquid alternative fuel from the liquid supply system and is operated by combusting the vapor alternative fuel from the vapor supply system.

In another aspect, a method of generating power using a power generation system is provided. The power generation system includes a combustion system, a liquid supply system, and a vapor supply system. The vapor supply system includes a heat recovery steam generator and a vaporization system. The method includes channeling a first liquid alternative fuel from the liquid supply system to the combustion system. The method also includes igniting the combustion system with the first liquid alternative fuel from the liquid supply system by combusting the first liquid alternative fuel to generate power and exhaust gases. The method further includes channeling the exhaust gases from the combustion system to the heat recovery steam generator. The method also includes heating a heat exchange medium within the heat recovery steam generator using the exhaust gases. The method further includes channeling the heat exchange medium from the heat recovery steam generator to the vaporization system. The method also includes vaporizing a second liquid alternative fuel using the heat exchange medium to generate a vapor alternative fuel. The method further includes channeling the vapor alternative fuel to the combustion system. The method also includes operating the combustion system by combusting the vapor alternative fuel.

In another aspect, a method of generating power using a power generation system is provided. The power generation system includes a combustion system and a vapor supply system. The method includes generating steam using an auxiliary boiler. The method also includes channeling the steam from the auxiliary boiler to a vaporization system. The method further includes vaporizing a liquid alternative fuel using the steam to generate a vapor alternative fuel. The method also includes channeling the vapor alternative fuel to the combustion system. The method further includes igniting and operating the combustion system by combusting the vapor alternative fuel.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged and include all the sub-ranges contained therein unless context or language indicates otherwise. Additionally, unless otherwise indicated, the terms "first," "second," etc. are used herein merely as labels and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, the terms "axial" and "axially" refer to directions and orientations extending substantially parallel to a longitudinal axis of a rotary machine. Moreover, the terms "radial" and "radially" refer to directions and orientations extending substantially perpendicular to the longitudinal axis of the rotary machine. In addition, as used herein, the terms "circumferential" and "circumferentially" refer to directions and orientations extending arcuately about the longitudinal axis of the rotary machine. Further, as used herein, the term "upstream" refers to a forward or inlet end of a rotary machine, and the term "downstream" refers to an aft or exhaust end of the rotary machine.

The systems described herein relate to power generation systems that ignite and operate using an alternative fuel. Specifically, the power generation system described herein includes a storage and distribution system, a liquid supply system, a vapor supply system, and a combustion system. The storage and distribution system stores a volume of an alternative fuel, such as ethanol, and channels a portion of the stored ethanol to the liquid supply system and to the vapor supply system. The liquid supply system receives liquid ethanol from the storage and distribution system and channels the liquid ethanol to the combustion system. The vapor supply system receives ethanol from the storage and distribution system, vaporizes the liquid ethanol into a vapor ethanol that is channeled to the combustion system. The combustion system generates power by igniting the liquid ethanol from the liquid supply system. Exhaust gases from the combustion system are then channeled to a heat recovery steam generator within the vapor supply system, where the heat recovery steam generator generates steam that is channeled to heat exchangers within the vapor supply system. The heat exchangers vaporize the liquid ethanol into a vaporized ethanol that is channeled to the combustion system.

The combustion system initiates combusting liquid ethanol from the liquid supply system and vaporized ethanol from the vapor supply system during a transition period. More specifically, the liquid supply system gradually reduces the volume of the liquid ethanol supplied to the combustion system, and the vapor supply system increases the volume of the vaporized ethanol supplied to the combustion system until the combustion system is combusting only vaporized ethanol. Accordingly, the power generation system described herein ignites and subsequently is operated using an alternative fuel. Typically, power generation systems that generate power using alternative fuels emit less greenhouse gases and have greater operational flexibility than power generation systems that generate power using conventional fuels. Accordingly, the power generation systems described herein facilitate reducing fossil fuel emissions and having greater operational flexibility by generating power with alternative fuels such as ethanol.

Figure 1:
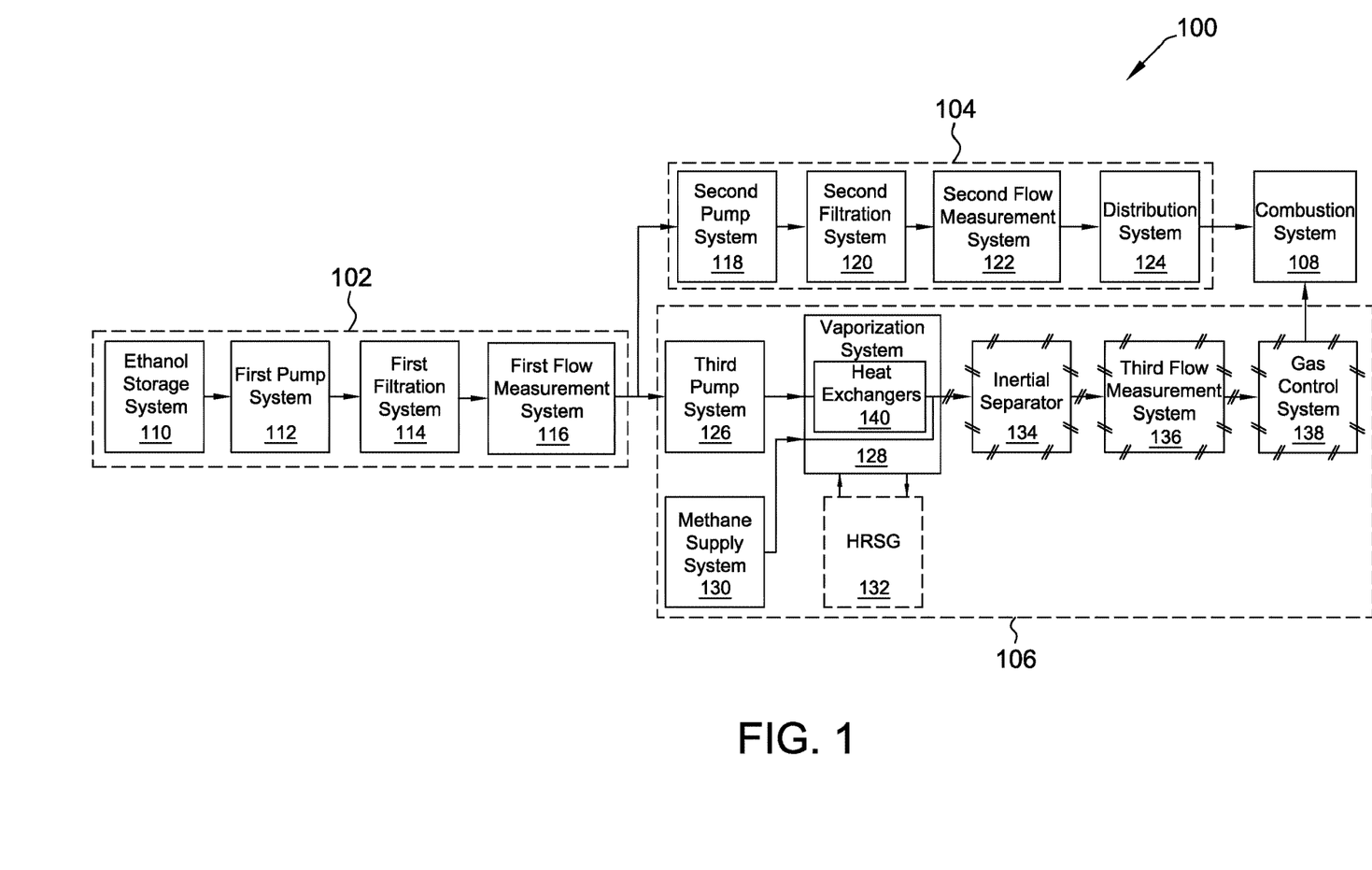
FIG. 1 is a block flow diagram of an exemplary power generation system.

FIG. 1 is a block flow diagram of an exemplary power generation system 100 that generates power using an alternative fuel. In the exemplary embodiment, the alternative fuel is ethanol. However, the alternative fuel may be any other type of non-conventional liquid fuel that enables system 100 to operate as described herein, including, but not limited to, bio-diesels, alcohol based fuels (methanol, ethanol, etc.), bio-alcohols, vegetable oils, and/or other biomass fuels. As used herein, conventional fuels are typically fossil fuels, such as, but not limited to, petroleum products, coal, and/or natural gas. Furthermore, while system 100 is configured to generate power using alternative fuels, system 100 may also generate power using conventional fuels, such as, but not limited to, petroleum products, coal, and/or natural gas (methane).

In the exemplary embodiment, power generation system 100 includes a storage and distribution system 102, a liquid supply system 104, a vapor supply system 106, and a combustion system 108. Storage and distribution system 102 stores a volume of ethanol and channels a portion of the stored ethanol to liquid supply system 104 and to vapor supply system 106. Liquid supply system 104 receives liquid ethanol from storage and distribution system 102 and channels the liquid ethanol to combustion system 108. Vapor supply system 106 receives liquid ethanol from storage and distribution system 102, vaporizes the liquid ethanol into a vapor ethanol, and channels the vapor ethanol to combustion system 108. Additionally, vapor supply system 106 may also channel vapor methane to combustion system 108. Combustion system 108 generates power by combusting the liquid ethanol from liquid supply system 104, the vapor ethanol from vapor supply system 106, and/or a different fuel from either liquid supply system 104 or vapor supply system 106.

In the exemplary embodiment, storage and distribution system 102 includes an ethanol storage system 110, a first pump system 112, a first filtration system 114, and a first flow measurement system 116. Ethanol storage system 110 includes at least one storage tank (not shown) that receives and stores a volume of ethanol. Ethanol storage system 110 may receive ethanol from a pipeline, a nearby production facility, a ship, and/or a tanker truck, for example.

First pump system 112 transfers ethanol from ethanol storage system 110 to first filtration system 114, to first flow measurement system 116, to liquid supply system 104, and/or to vapor supply system 106. In the exemplary embodiment, first pump system 112 includes a pump. In alternative embodiments, first pump system 112 includes any type of fluid motive device that enables storage and distribution system 102 to operate as described herein.

In the exemplary embodiment, first filtration system 114 filters particle and/or debris from the ethanol received from first pump system 112 to facilitate protecting downstream equipment from such particles and/or debris that may be entrained within the ethanol received from first pump system 112. First filtration system 114 may include any type of filter that enables storage and distribution system 102 to operate as described herein.

In the exemplary embodiment, first flow measurement system 116 measures the ethanol from first pump system 112 in order to better control liquid supply system 104 and/or vapor supply system 106. First flow measurement system 116 may include any type of flowmeter that enables storage and distribution system 102 to operate as described herein. Ethanol is channeled from first flow measurement system 116 to liquid supply system 104 and/or vapor supply system 106.

In the exemplary embodiment, liquid supply system 104 includes a second pump system 118, a second filtration system 120, a second flow measurement system 122, and a flow control and distribution system 124. Second pump system 118 transfers ethanol from first flow measurement system 116 to second filtration system 120, to second flow measurement system 122, to flow control and distribution system 124, and/or to combustion system 108. In the exemplary embodiment, second pump system 118 includes a pump. In alternative embodiments, second pump system 118 includes any type of fluid motive device that enables liquid supply system 104 to operate as described herein.

In the exemplary embodiment, second filtration system 120 filters particles and/or debris from the ethanol received from second pump system 118 to protect downstream equipment from such particles and/or debris that may be entrained within the ethanol received from second pump system 118. Second filtration system 120 may include any type of filter that enables liquid supply system 104 to operate as described herein. Liquid supply system 104 may also include a Safety Shutoff Valve (SSOV) to protect the equipment within liquid supply system 104 and/or combustion system 108.

In the exemplary embodiment, second flow measurement system 122 measures the ethanol from second pump system 118 in order to control liquid supply system 104 and/or combustion system 108. Second flow measurement system 122 may include any type of flowmeter that enables liquid supply system 104 to operate as described herein. In the exemplary embodiment, flow control and distribution system 124 controls the ethanol from flow measurement system 122 to combustion system 108. Flow control and distribution system 124 includes valves, actuators, and/or other flow control equipment that controls delivery or flow rate of ethanol to combustion system 108. Ethanol is channeled from flow control and distribution system 124 to combustion system 108.

In the exemplary embodiment, vapor supply system 106 includes a third pump system 126, a vaporization system 128, a methane supply system 130, a heat recovery steam generator (HRSG) 132, an inertial separator 134, a third flow measurement system 136, and a gas control system 138. Third pump system 126 transfers ethanol from first flow measurement system 116 to vaporization system 128, to inertial separator 134, to third flow measurement system 136, to gas control system 138, and/or to combustion system 108. In the exemplary embodiment, third pump system 126 includes a pump. In alternative embodiments, third pump system 126 includes any type of fluid motive device that enables vapor supply system 106 to operate as described herein.

In the exemplary embodiment, vaporization system 128 vaporizes the ethanol from third pump system 126. Vaporization system 128 includes at least one heat exchanger 140 that transfers heat from a heat exchange medium from HRSG 132 to the ethanol from third pump system 126 to cause the ethanol from third pump system 126 to vaporize. In alternative embodiments, vaporization system 128 includes a plurality of heat exchangers 140 that vaporize the ethanol from third pump system 126. In the exemplary embodiment, components of vaporization system 128 downstream of heat exchangers 140 are heat traced (as indicated by parallel hash marks on FIG. 1) to preheat equipment within vaporization system 128 in order to receive vaporized ethanol from heat exchangers 140. Heat tracing within vaporization system 128 may also be used to preheat equipment within vaporization system 128 in order to receive methane from methane supply system 130.

In the exemplary embodiment, methane supply system 130 channels methane into vaporization system 128 downstream from heat exchanger 140. The heating value of methane is similar to the heating value of ethanol, such that combustion system 108 is able to combust either ethanol vapor or methane. As such, methane can be used as an alternate fuel source if ethanol is not available. Thus, methane supply system 130 supplies combustion system 108 with methane if ethanol is not available. Additionally, methane supply system 130 may supply methane to supplement the vaporized ethanol. Accordingly, methane supply system 130 increases the operational flexibility of power generation system 100.

In the exemplary embodiment, HRSG 132 receives exhaust gases from combustion system 108 and transfers heat from the exhaust gases to a heat exchange medium. HRSG 132 also channels a heat exchange medium to heat exchangers 140 and receives a heat exchange medium from heat exchangers 140. In the exemplary embodiment, HRSG 132 includes a heat exchanger that recovers heat from the exhaust gases from combustion system 108 and transfers the recovered heat to a heat exchange medium. In the exemplary embodiment, the heat exchange medium includes liquid water and/or steam. However, the heat exchange medium may include any type of heat transfer fluid that enables vapor supply system 106 to operate as described herein.

HRSG 132 and heat exchangers 140 form a closed loop circuit that channels the heat exchange medium from HRSG 132 and heat exchangers 140 and from heat exchangers 140 back to HRSG 132. As such, HRSG 132 increases the temperature of the heat exchange medium by transferring heat from the exhaust gases to the heat exchange medium, and heat exchangers 140 decrease the temperature of the heat exchange medium by transferring heat from the heat exchange medium to the ethanol to vaporize the ethanol.

In the exemplary embodiment, inertial separator 134 separates liquids that may be entrained in the vaporized ethanol from vapor ethanol. The vaporized ethanol from vaporization system 128 may include liquids entrained in the vapor ethanol. Specifically, liquid ethanol droplets may be entrained in the vaporized ethanol and/or the heat exchange medium may leak into the vaporized ethanol because of a failure within heat exchangers 140. In the exemplary embodiment, inertial separator 134 includes a centrifugal separator. However, inertial separator 134 may include any other type of separator that enables vapor supply system 106 to operate as described herein. In the exemplary embodiment, components of inertial separator 134 downstream from heat exchangers 140 are heat traced (as indicated by parallel hash marks on FIG. 1) to preheat equipment within inertial separator 134 in order to receive vaporized ethanol from heat exchangers 140.

In the exemplary embodiment, third flow measurement system 136 measures the vaporized ethanol from inertial separator 134 in order to control vapor supply system 106 and/or combustion system 108. Third flow measurement system 136 measures the flow of vaporized ethanol but does not control the flow of vaporized ethanol. Flow measurement is used for tabulating or totaling flow consumption when operating only on ethanol vapor or can be used as a method of controlling mixture or blend ratios during periods of operation when mixtures of both methane and ethanol vapor are used. Third flow measurement system 136 may include any type of flowmeter that enables vapor supply system 106 to operate as described herein.

In the exemplary embodiment, gas control system 138 controls the vaporized ethanol from third flow measurement system 136 to combustion system 108. Gas control system 138 includes valves, actuators, and/or other flow control equipment oriented to control the vaporized ethanol to combustion system 108. The vaporized ethanol is channeled from gas control system 138 to combustion system 108. In the exemplary embodiment, components of third flow measurement system 136 and gas control system 138 downstream from heat exchangers 140 are heat traced (as indicated by parallel hash marks on FIG. 1) to preheat equipment within third flow measurement system 136 and gas control system 138 in order to receive vaporized ethanol from heat exchangers 140.

In the exemplary embodiment, combustion system 108 is a gas turbine engine. Alternatively, combustion system 108 may be any other turbine engine and/or rotary machine, including, without limitation, a gas turbofan aircraft engine and/or other aircraft engine.

Figure 2:
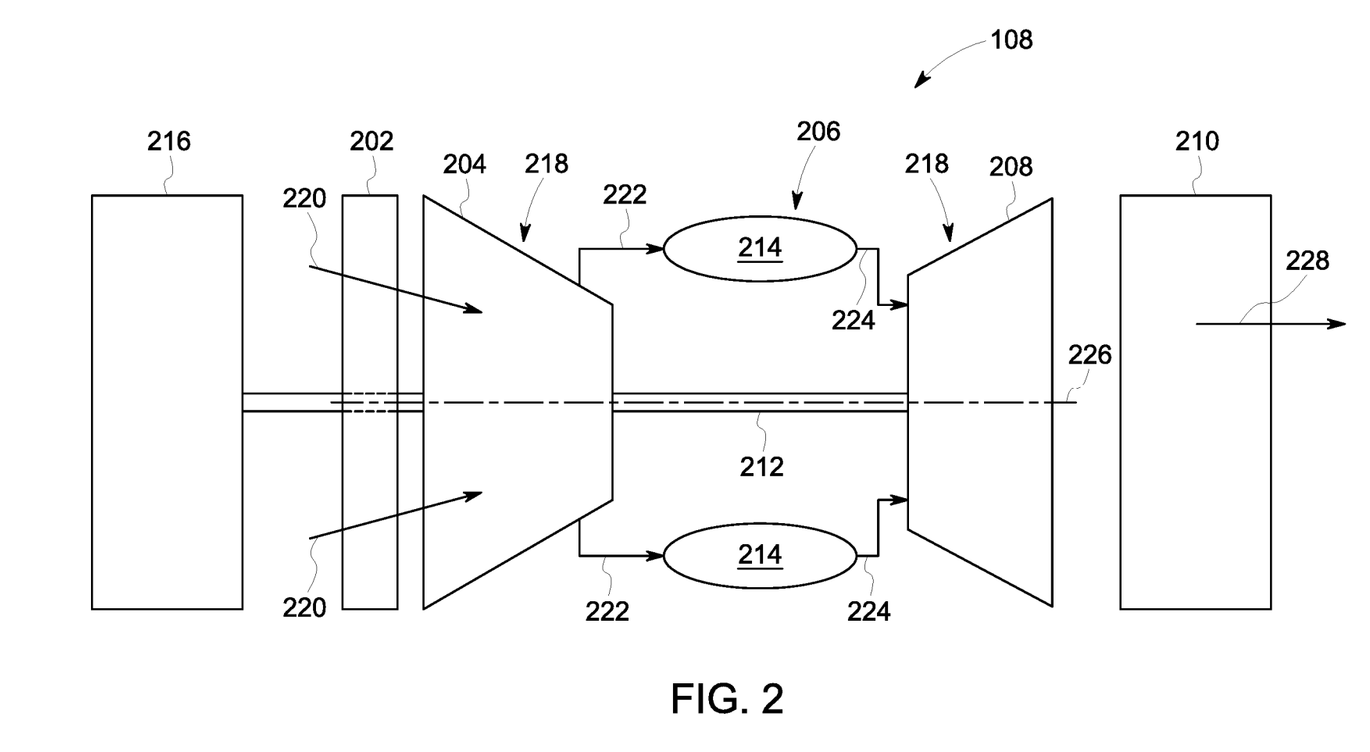
FIG. 2 is a schematic view of an exemplary combustion system that may be used in the power generation system shown in FIG. 1.

FIG. 2 is an enlarged schematic view of an exemplary combustion system 108. In the exemplary embodiment, combustion system 108 includes an intake section 202, a compressor section 204 that is downstream from intake section 202, a combustor section 206 that is downstream from compressor section 204, a turbine section 208 that is downstream from combustor section 206, and an exhaust section 210 that is downstream from turbine section 208. Turbine section 208 is coupled to compressor section 204 via a rotor shaft 212. It should be noted that, as used herein, the term "couple" is not limited to a direct mechanical, thermal, electrical, and/or flow communication connection between components but may also include an indirect mechanical, thermal, electrical, and/or flow communication connection between multiple components.

In the exemplary embodiment, combustor section 206 includes a plurality of combustors 214 and a plurality of fuel nozzles (not shown). Combustor section 206 is coupled to compressor section 204 such that each combustor 214 is in flow communication with the compressor section 204. Rotor shaft 212 is also coupled to a load 216 such as, but not limited to, an electrical generator and/or a mechanical drive application. In the exemplary embodiment, each of compressor section 204 and turbine section 208 includes at least one rotor assembly 218 that is coupled to rotor shaft 212.

In operation, intake section 202 channels air 220 towards compressor section 204. Compressor section 204 compresses inlet air 220 to higher pressures prior to discharging compressed air 222 towards combustor section 206. Compressed air 222 is channeled to combustor section 106 where it is mixed with the ethanol from liquid supply system 104 and/or the ethanol from vapor supply system 106 and burned to generate high temperature combustion gases 224. More specifically, the ethanol from liquid supply system 104 is channeled at a high pressure to the fuel nozzles. The fuel nozzles atomize the ethanol from liquid supply system 104 such that the atomized ethanol mixes with compressed air 222. Combustion gases 224 are channeled downstream towards turbine section 208 and impinge upon turbine blades (not shown), converting thermal energy to mechanical rotational energy that is used to drive rotor assembly 218 about a longitudinal axis 226. Often, combustor section 206 and turbine section 208 are referred to as a hot gas section of combustion system 108. Exhaust gases 228 are then discharged through exhaust section 210 to HRSG 132.

During operation of power generation system 100, storage and distribution system 102 channels ethanol to liquid supply system 104, and liquid supply system 104 channels the ethanol to combustion system 108. Combustion system 108 is ignited using liquid ethanol from liquid supply system 104. Accordingly, combustion system 108 is started using an alternative fuel. Exhaust gases 228 from combustion system 108 are channeled to HRSG 132. Once combustion system 108 has achieved a minimum operating load combusting liquid ethanol, vapor supply system 106 begins vaporizing ethanol and channeling the vaporized ethanol to combustion system 108. That is, once the temperature of exhaust gases is high enough to vaporize ethanol, vapor supply system 106 begins vaporizing ethanol and channeling the vaporized ethanol to combustion system 108. Combustion system 108 then begins combusting liquid ethanol from liquid supply system 104 and vaporized ethanol from vapor supply system 106 during a transition period. Liquid supply system 104 reduces the volume of the liquid ethanol, and vapor supply system 106 increases the volume of the vaporized ethanol until combustion system 108 is combusting only vaporized ethanol. Accordingly, power generation system 100 ignites and operates combustion system 108 using an alternative fuel.

In an alternative operational mode, methane supply system 130 channels methane into vaporization system 128 downstream of heat exchanger 140 such that the methane mixes with the vaporized ethanol. As such, the methane supplements the vaporized ethanol, and combustion system 108 operates on a mixture of vaporized ethanol and methane. In another alternative operational mode, methane supply system 130 channels methane into vaporization system 128 downstream of heat exchanger 140, and vaporization system 128 is not vaporizing ethanol. As such, combustion system 108 operates on methane only.

Figure 3:
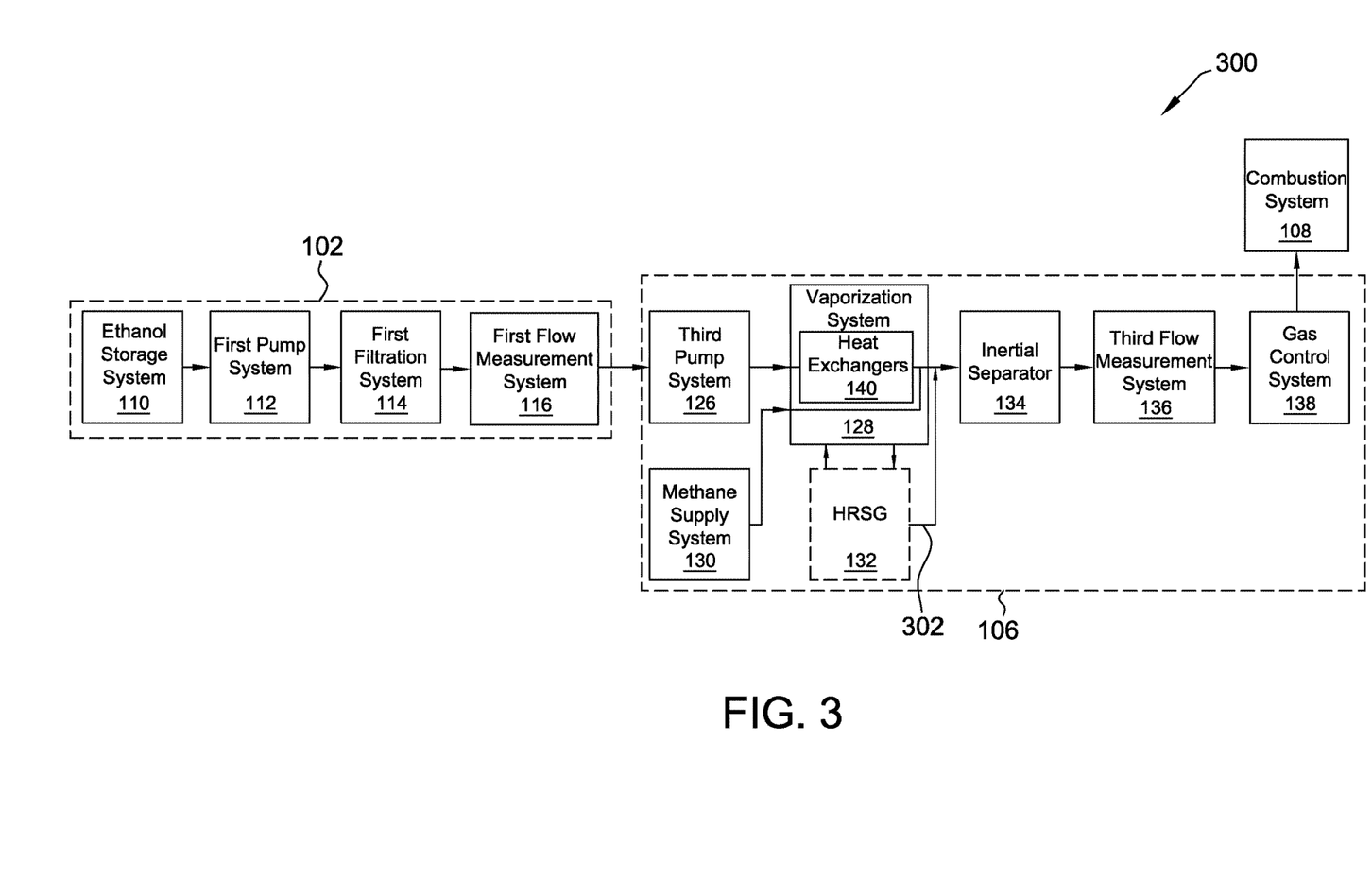
FIG. 3 is a block flow diagram of another exemplary power generation system.

FIG. 3 is a block flow diagram of an exemplary power generation system 300 that generates power with an alternative fuel and is ignited on methane only. More specifically, combustion system 108 is ignited using only methane, enabling exhaust gases 228 to heat HRSG 132. HRSG 132 increases the temperature of the heat exchange medium by transferring heat from the exhaust gases to the heat exchange medium, and heat exchangers 140 decrease the temperature of the heat exchange medium by transferring heat from the heat exchange medium to the ethanol to vaporize the ethanol. As such, combustion of the methane allows vaporization system 128 to begin producing vaporized ethanol. The vaporized ethanol is then blended with the methane, and combustion system 108 begins operating on a blend of methane and vaporized ethanol. Combustion system 108 either remains operating on the blend of methane and vaporized ethanol or switches over to operating on only vaporized ethanol.

Power generation system 300 is substantially similar to power generation system 100 except, in power generation system 300, liquid supply system 104, vaporization system 128, inertial separator 134, third flow measurement system 136, and gas control system 138 do not include heat tracing. Alternatively, power generation system 300 may include liquid supply system 104 but liquid supply system 104 is idle during operation of power generation system 300.

During operation of power generation system 300, methane is channeled from methane supply system 130 through vaporization system 128, inertial separator 134, third flow measurement system 136, and gas control system 138 to combustion system 108. Combustion system 108 is ignited using methane from methane supply system 130. Exhaust gases 228 from combustion system 108 are channeled to HRSG 132.

Once combustion system 108 has achieved a minimum operating load combusting methane, vapor supply system 106 begins vaporizing ethanol and channeling the vaporized ethanol to combustion system 108. That is, once the temperature of exhaust gases is high enough to vaporize ethanol, vapor supply system 106 begins vaporizing ethanol and channeling the vaporized ethanol to combustion system 108.

More specifically, vapor supply system 106 mixes the vaporized ethanol with methane, and combustion system 108 then begins combusting the mixture of methane from methane supply system 130 and vaporized ethanol from vapor supply system 106 during a transition period. Methane supply system 130 reduces the volume of methane, and vapor supply system 106 increases the volume of the vaporized ethanol until combustion system 108 is combusting only vaporized ethanol. Accordingly, power generation system 300 ignites combustion system 108 using a conventional fuel (e.g., methane) and operates combustion system 108 using an alternative fuel (e.g., vaporized ethanol).

Power generation system 300 may also include a steam pipe 302 coupled to HRSG 132 and inertial separator 134. In some operating modes, combustion of methane generates exhaust gases 228 that heat HRSG 132. HRSG 132 generates steam that is channeled into inertial separator 134, third flow measurement system 136, and gas control system 138 to preheat equipment within inertial separator 134, third flow measurement system 136, and gas control system 138 in order to begin receiving vaporized ethanol from vaporization system 128.

Figure 4:
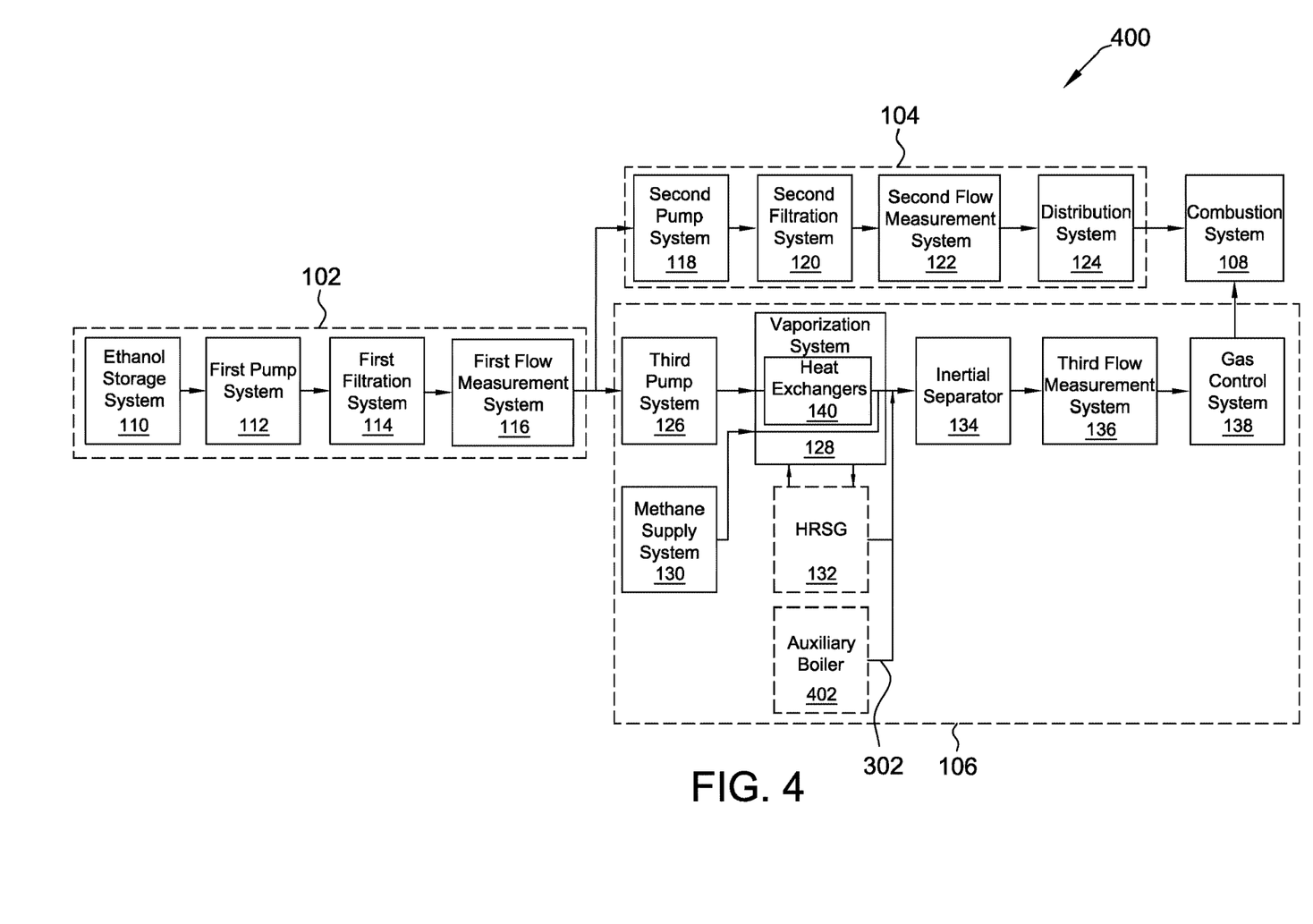
FIG. 4 is a block flow diagram of another exemplary power generation system.

FIG. 4 is a block flow diagram of an exemplary power generation system 400 that generates power with an alternative fuel and that is ignited using liquid ethanol. Power generation system 400 is substantially similar to power generation system 300, except vapor supply system 106 also includes an auxiliary boiler 402, and steam pipe 302 is coupled to HRSG 132, auxiliary boiler 402, and inertial separator 134. Combustion system 108 is ignited using liquid ethanol, and auxiliary boiler 402 preheats equipment within inertial separator 134, third flow measurement system 136, and gas control system 138 in order to receive vaporized ethanol from vaporization system 128.

While auxiliary boiler 402 is preheating portions of vapor supply system 106, exhaust gases 228 heat HRSG 132. HRSG 132 increases the temperature of the heat exchange medium by transferring heat from the exhaust gases to the heat exchange medium, and heat exchangers 140 decrease the temperature of the heat exchange medium by transferring heat from the heat exchange medium to the ethanol to vaporize the ethanol. As such, combustion of the liquid ethanol allows vaporization system 128 to begin producing vaporized ethanol. The vaporized ethanol is then blended with the liquid ethanol and combustion system 108 begins operating on a blend of liquid ethanol and vaporized ethanol. Preheating portions of vapor supply system 106 with auxiliary boiler 402 enables vapor supply system 106 to quickly begin producing vaporized ethanol and to quickly switch to operating only on vaporized ethanol.

During operation of power generation system 400, steam pipe 302 channels steam from auxiliary boiler 402 and/or HRSG 132 into inertial separator 134. The steam preheats equipment within inertial separator 134, third flow measurement system 136, and gas control system 138 in order to receive vaporized ethanol from vaporization system 128. Auxiliary boiler 402 generates steam using electricity, combustion of natural gas, combustion of ethanol, and/or any other source of energy. Storage and distribution system 102 then channels ethanol to liquid supply system 104, and liquid supply system 104 channels the ethanol to combustion system 108. Combustion system 108 is ignited using liquid ethanol from liquid supply system 104. Accordingly, combustion system 108 is started using an alternative fuel. Exhaust gases 228 from combustion system 108 are channeled to HRSG 132.

Once combustion system 108 has achieved a minimum operating load combusting liquid ethanol, vapor supply system 106 begins vaporizing ethanol and channeling the vaporized ethanol to combustion system 108. That is, once the temperature of exhaust gases is high enough to vaporize ethanol, vapor supply system 106 begins vaporizing ethanol and channeling the vaporized ethanol to combustion system 108. Combustion system 108 then begins combusting liquid ethanol from liquid supply system 104 and vaporized ethanol from vapor supply system 106 during a transition period. Liquid supply system 104 reduces the volume of the liquid ethanol, and vapor supply system 106 increases the volume of the vaporized ethanol until combustion system 108 is combusting only vaporized ethanol. Accordingly, power generation system 400 ignites and operates combustion system 108 using an alternative fuel.

During an alternative operational mode of power generation system 400, steam from auxiliary boiler 402 is channeled into inertial separator 134, third flow measurement system 136, and gas control system 138 to preheat equipment within inertial separator 134, third flow measurement system 136, and gas control system 138. After auxiliary boiler 402 has preheated portions of vapor supply system 106, methane is channeled from methane supply system 130 through vaporization system 128, inertial separator 134, third flow measurement system 136, and gas control system 138 to combustion system 108. Combustion system 108 is ignited using methane from methane supply system 130. Exhaust gases 228 from combustion system 108 are channeled to HRSG 132.

Once combustion system 108 has achieved a minimum operating load combusting methane, vapor supply system 106 begins vaporizing ethanol and channeling the vaporized ethanol to combustion system 108. That is, once the temperature of exhaust gases is high enough to vaporize ethanol, vapor supply system 106 begins vaporizing ethanol and channeling the vaporized ethanol to combustion system 108. More specifically, vapor supply system 106 mixes the vaporized ethanol with methane, and combustion system 108 then begins combusting the mixture of methane from methane supply system 130 and vaporized ethanol from vapor supply system 106 during a transition period. Methane supply system 130 reduces the volume of the methane, and vapor supply system 106 increases the volume of the vaporized ethanol until combustion system 108 is combusting only vaporized ethanol. Accordingly, power generation system 400 ignites combustion system 108 using a conventional fuel (e.g., methane) and operates combustion system 108 using an alternative fuel (e.g., vaporized ethanol).

Figure 5:
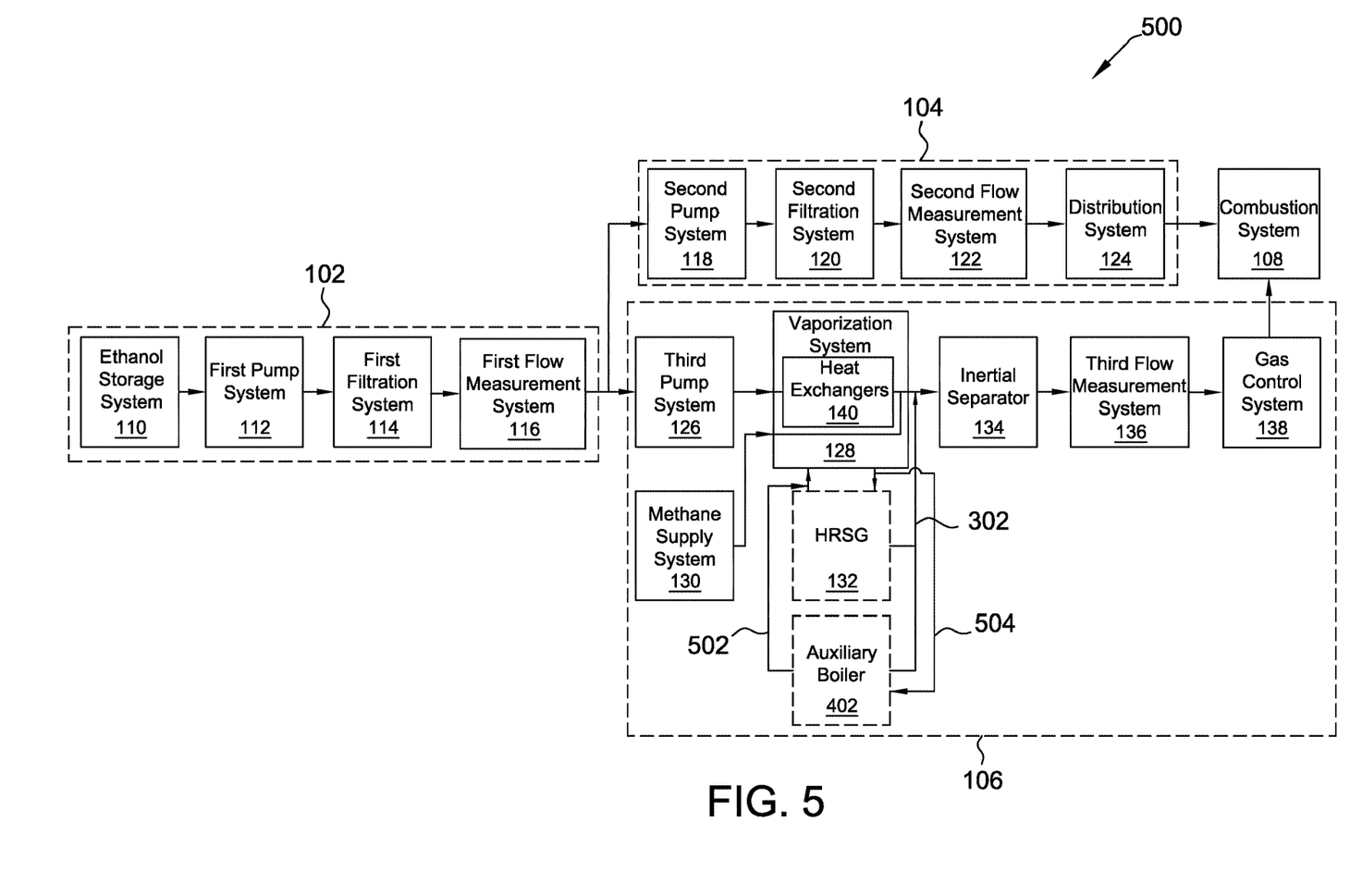
FIG. 5 is a block flow diagram of another exemplary power generation system.

FIG. 5 is a block flow diagram of an exemplary power generation system 500 that generates power with an alternative fuel. Power generation system 500 is substantially similar to power generation system 400, except vapor supply system 106 also includes a steam or water supply pipe 502 also coupled to auxiliary boiler 402 and heat exchangers 140 of vaporization system 128 and a steam or condensate return pipe 504 coupled to auxiliary boiler 402 and heat exchangers 140 of vaporization system 128. Steam or water supply pipe 502 channels steam or water from auxiliary boiler 402 to heat exchangers 140 of vaporization system 128 to vaporize the ethanol from third pump system 126. Steam or condensate return pipe 504 channels steam or condensate from heat exchangers 140 of vaporization system 128 back to auxiliary boiler 402. Auxiliary boiler 402 generates steam using electricity, combustion of natural gas, combustion of ethanol, and/or any other source of energy.

During operation of power generation system 500, steam from auxiliary boiler 402 is channeled to heat exchangers 140 of vaporization system 128. Simultaneously, third pump system 126 pumps liquid ethanol to vaporization system 128, and steam from auxiliary boiler 402 vaporizes the liquid ethanol. Storage and distribution system 102 then channels ethanol to liquid supply system 104, and liquid supply system 104 channels the ethanol to combustion system 108. Combustion system 108 is ignited using liquid ethanol from liquid supply system 104. Accordingly, combustion system 108 is started using an alternative fuel. Combustion system 108 then begins combusting liquid ethanol from liquid supply system 104 and vaporized ethanol from vapor supply system 106 during a transition period. Liquid supply system 104 reduces the volume of the liquid ethanol, and vapor supply system 106 increases the volume of the vaporized ethanol until combustion system 108 is combusting only vaporized ethanol. Exhaust gases 228 from combustion system 108 are channeled to HRSG 132.

Once combustion system 108 has achieved a minimum operating load combusting liquid ethanol, HRSG 132 begins channeling steam to vaporization system 128, and auxiliary boiler 402 reduces production of steam until HRSG 132 is producing all steam necessary to vaporize the liquid ethanol. Accordingly, power generation system 500 ignites and operates combustion system 108 using an alternative fuel.

During an alternative operational mode of power generation system 500, steam from auxiliary boiler 402 is channeled into inertial separator 134, third flow measurement system 136, and gas control system 138 by steam pipe 302 to preheat equipment within inertial separator 134, third flow measurement system 136, and gas control system 138. Steam from auxiliary boiler 402 is also channeled to heat exchangers 140 of vaporization system 128 to vaporize the ethanol from third pump system 126 using steam supply pipe 502. Vapor supply system 106 vaporizes the ethanol and channels the vaporized ethanol to combustion system 108. Combustion system 108 is then ignited and operated using vaporized ethanol from vapor supply system 106. Accordingly, combustion system 108 is started using a vaporized alternative fuel. Exhaust gases 228 from combustion system 108 are channeled to HRSG 132.

Once combustion system 108 has achieved a minimum operating load combusting vaporized ethanol, HRSG 132 begins channeling steam to vapor supply system 106. That is, once the temperature of exhaust gases is high enough to vaporize ethanol, HRSG 132 begins channeling steam to vapor supply system 106 and vapor supply system 106 begins vaporizing ethanol using the steam from HRSG 132. Combustion system 108 then begins combusting vaporized ethanol that has been vaporized using steam from HRSG 132 rather than auxiliary boiler 402. Accordingly, power generation system 500 ignites and operates combustion system 108 using a vaporized alternative fuel.

Figure 6:
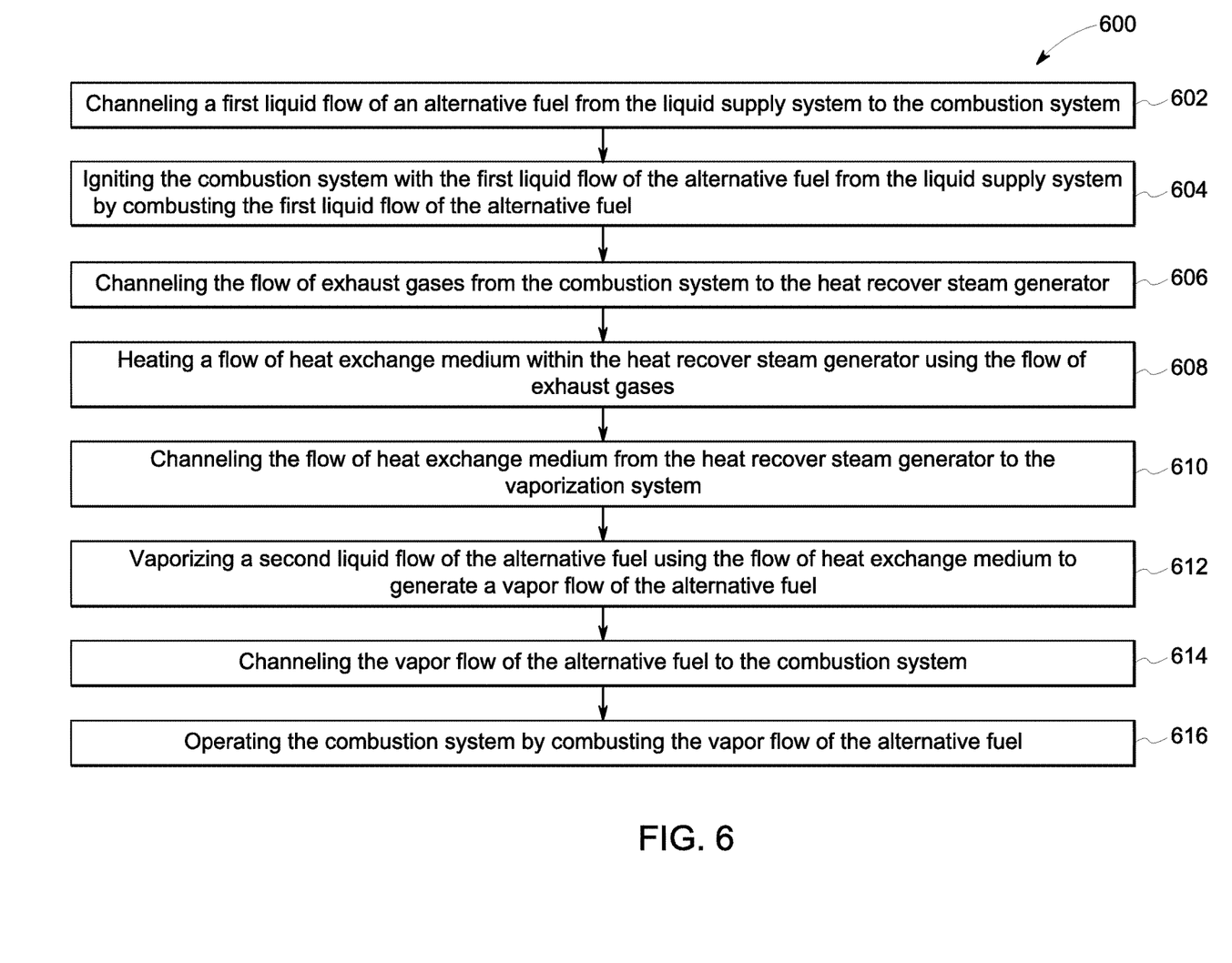
FIG. 6 is a flow diagram of an exemplary method of generating power using the power generation system of FIG. 1.

FIG. 6 is a flow diagram of an exemplary method 600 of generating power using power generation system 100 (shown in FIG. 1). Power generation system 100 includes combustion system 108, liquid supply system 104, and vapor supply system 106. Vapor supply system 106 includes HRSG 132 and vaporization system 128. In the exemplary embodiment, method 600 includes channeling 602 a first liquid alternative fuel from liquid supply system 104 to combustion system 108. Method 600 also includes igniting 604 combustion system 108 with the first liquid alternative fuel from liquid supply system 104 by combusting the first liquid alternative fuel. Combustion of the first liquid alternative fuel generates power and exhaust gases. Method 600 further includes channeling 606 the exhaust gases from combustion system 108 to HRSG 132. Method 600 also includes heating 608 a heat exchange medium within HRSG 132 using the exhaust gases. Method 600 further includes channeling 610 the heat exchange medium from HRSG 132 to vaporization system 106. Method 600 also includes vaporizing 612 a second liquid alternative fuel using the heat exchange medium to generate a vapor alternative fuel. Method 600 further includes channeling 614 the vapor alternative fuel to combustion system 108. Method 600 also includes operating 616 combustion system 108 by combusting the vapor alternative fuel.

Figure 7:
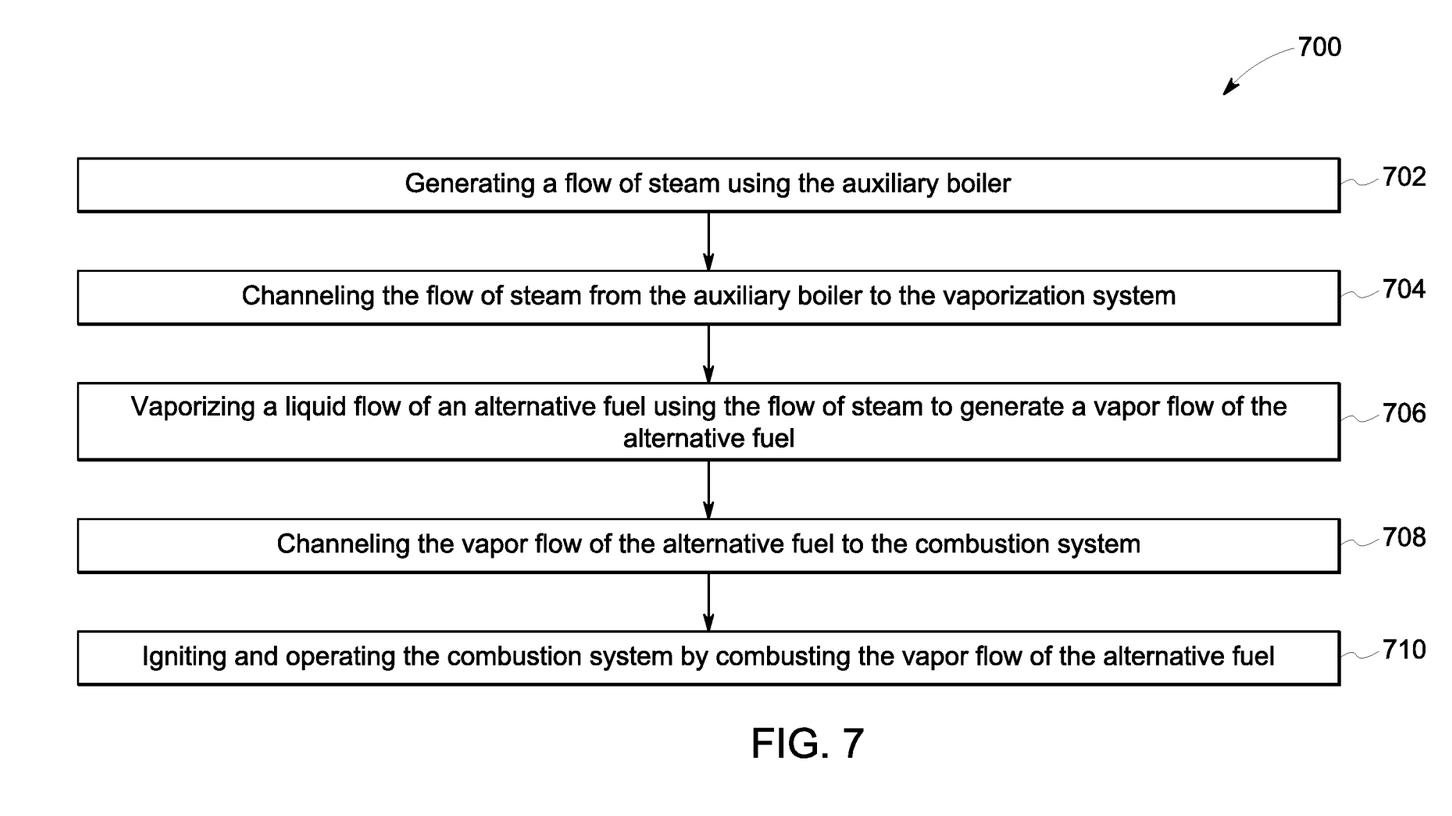
FIG. 7 is a flow diagram of an exemplary method of generating power using the power generation system of FIG. 5.

FIG. 7 is a flow diagram of an exemplary method 700 of generating power using power generation system 500 (shown in FIG. 5). Power generation system 500 includes combustion system 108 and vapor supply system 106. Vapor supply system 106 includes vaporization system 128 and auxiliary boiler 402. Method 700 includes generating 702 steam using auxiliary boiler 402. Method 700 also includes channeling 704 the steam from auxiliary boiler 402 to vaporization system 106. Method 700 further includes vaporizing 706 a liquid alternative fuel using the steam to generate a vapor alternative fuel. Method 700 also includes channeling 708 the vapor alternative fuel to combustion system 108. Method 700 further includes igniting and operating 710 combustion system 108 by combusting the vapor alternative fuel.

The above described power generation systems ignite and operate using an alternative fuel. Specifically, the power generation system described herein includes a storage and distribution system, a liquid supply system, a vapor supply system, and a combustion system. The storage and distribution system stores a volume of an alternative fuel, such as ethanol, and channels a portion of the stored ethanol to the liquid supply system and to the vapor supply system. The liquid supply system receives liquid ethanol from the storage and distribution system and channels the liquid ethanol to the combustion system. The vapor supply system receives ethanol from the storage and distribution system, vaporizes the liquid ethanol into a vapor ethanol that is channeled to the combustion system. The combustion system generates power by igniting the liquid ethanol from the liquid supply system. Exhaust gases from the combustion system are then channeled to a heat recovery steam generator within the vapor supply system, where the heat recovery steam generator generates steam that is channeled to heat exchangers within the vapor supply system. The heat exchangers vaporize the liquid ethanol into a vaporized ethanol that is channeled to the combustion system.

The combustion system initiates combusting liquid ethanol from the liquid supply system and, during a transition period, operates using liquid ethanol and vaporized ethanol from the vapor supply system. More specifically, the liquid supply system reduces the volume of the liquid ethanol, and the vapor supply system increases the volume of the vaporized ethanol until the combustion system is combusting only vaporized ethanol. Accordingly, the power generation system described herein ignites and subsequently is operated using an alternative fuel. Typically, power generation systems that generate power using alternative fuels emit less greenhouse gases and have greater operational flexibility than power generation systems that generate power using conventional fuels. Accordingly, the power generation systems described herein facilitate reducing fossil fuel emissions and have greater operational flexibility by generating power with alternative fuels such as ethanol.

Additionally, an exemplary technical effect of the systems and methods described herein includes at least one of: (a) igniting a combustion system using a liquid alternative fuel; (b) igniting a combustion system using a vapor alternative fuel; and (c) operating a combustion system using a vapor alternative fuel.

Exemplary embodiments of systems and methods for generating power using an alternative fuel are described above in detail. The methods and systems are not limited to the specific embodiments described herein, but rather, components of systems and/or steps of the methods may be utilized independently and separately from other components and/or steps described herein. For example, the method may also be used in combination with other power generation systems and are not limited to practice only with the other power generation systems as described herein. Rather, the exemplary embodiment can be implemented and utilized in connection with many other other power generation applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims and may include other examples that occur to those skilled in the art. Such other examples are intended to be within the scope of the claims if they have structural elements that do not differ from the literal language of the claims or if they include equivalent structural elements with insubstantial differences from the literal language of the claims.

What is claimed is:

1. A method of generating power using a power generation system, the power generation system configured to generate power using only an alternative fuel, wherein the alternative fuel is at least one of a liquid alternative fuel and a vapor alternative fuel, the power generation system comprising:
    a gas turbine engine comprising a compressor, a combustor, and a turbine, the combustor configured to be ignited and operated using only the alternative fuel;
    a storage and distribution system configured to store the alternative fuel, wherein the alternative fuel does not comprise a fossil fuel;
    a liquid supply system coupled to the storage and distribution system to receive liquid alternative fuel from the storage and distribution system, the liquid supply system comprising:
        a first pump positioned to direct the liquid alternative fuel through a first conduit to the combustor;
        a first flow control device coupled to the first conduit for controlling a flow rate of the liquid alternative fuel therethrough; and
        a fuel nozzle within the combustor to atomize the liquid alternative fuel; and
    a vapor supply system coupled to the storage and distribution system and configured to generate a vapor alternative fuel by vaporizing liquid alternative fuel received from the storage and distribution system, the vapor supply system comprising:
        a vaporization system comprising at least one heat exchanger for vaporizing the liquid alternative fuel;
        a second pump positioned to direct the vapor alternative fuel through a second conduit to the combustor; and
        a second flow control device coupled to the second conduit for controlling a flow rate of the vapor alternative fuel therethrough,
    wherein the combustor is configured to achieve ignition using the liquid alternative fuel supplied from the liquid supply system,
    wherein the first flow control device and the second flow control device are controllable such that, after ignition, the first flow control device reduces a volume of the liquid alternative fuel delivered to the combustor while the second flow control device increases a volume of the vapor alternative fuel delivered to the combustor, and
    wherein the combustor is configured to be operated, subsequent to ignition, by combusting only vapor alternative fuel channeled from the vapor supply system, wherein said method comprises:
    channeling liquid alternative fuel through the first conduit from the liquid supply system to the combustor using the first pump and the first flow control device;
    atomizing the liquid alternative fuel and injecting the atomized liquid alternative fuel in the combustor;
    igniting the combustor using only the liquid alternative fuel supplied from the liquid supply system by combusting the liquid alternative fuel to generate power and exhaust gases;
    channeling exhaust gases from the combustor to a heat recovery steam generator;
    heating a heat exchange medium within the heat recovery steam generator using the exhaust gases;
    channeling the heat exchange medium from the heat recovery steam generator to the vapor supply system;
    vaporizing liquid alternative fuel received from the storage and distribution system using the heat exchange medium to generate the vapor alternative fuel;
    channeling the vapor alternative fuel through the second conduit to the combustor using the second pump and the second flow control device; and
    reducing a volume of the liquid alternative fuel delivered to the combustor and increasing a volume of the vapor alternative fuel, wherein the combustor is operated, subsequent to ignition, by combusting only the vapor alternative fuel.

2. The method of claim 1, wherein channeling the liquid alternative fuel from the liquid supply system to the combustor comprises channeling ethanol from the liquid supply system to the combustor.

3. The method of claim 1, wherein igniting the combustor using only the liquid alternative fuel from the liquid supply system by combusting the liquid alternative fuel to generate power and exhaust gases comprises igniting the gas turbine engine with the liquid alternative fuel from the liquid supply system by combusting the liquid alternative fuel to generate power and exhaust gases.

4. The method of claim 3, wherein the combustor is one of a plurality of combustors and the fuel nozzle is one of a plurality of fuel nozzles, wherein atomizing the liquid alternative fuel and injecting the atomized liquid alternative fuel is performed by the plurality of fuel nozzles.

5. The method of claim 1, further comprising channeling the vapor alternative fuel to an inertial separator.

6. The method of claim 5, wherein the inertial separator comprises a centrifugal separator, wherein said method further comprises separating entrained liquids in the vapor alternative fuel using the inertial separator.

7. The method of claim 1, further comprising preheating the vapor supply system using the heat exchange medium from the heat recovery steam generator.

8. The method of claim 3, wherein heating the heat exchange medium within the heat recovery steam generator using the exhaust gases comprises heating steam within the heat recovery steam generator using the exhaust gases.

9. A power generation system configured to generate power using only an alternative fuel, wherein the alternative fuel is at least one of a liquid alternative fuel and a vapor alternative fuel, the power generation system comprising:
 a gas turbine engine comprising a compressor, a combustor, and a turbine, the combustor configured to be ignited and operated using only the alternative fuel;
 a storage and distribution system configured to store the alternative fuel, wherein the alternative fuel does not comprise a fossil fuel;
 a liquid supply system coupled to the storage and distribution system to receive liquid alternative fuel from the storage and distribution system, the liquid supply system comprising:
  a first pump positioned to direct the liquid alternative fuel through a first conduit to the combustor;
  a first flow control device coupled to the first conduit for controlling a flow rate of the liquid alternative fuel therethrough; and
  a fuel nozzle within the combustor to atomize the liquid alternative fuel; and
 a vapor supply system coupled to the storage and distribution system and configured to generate a vapor alternative fuel by vaporizing liquid alternative fuel received from the storage and distribution system, the vapor supply system comprising:
  a vaporization system comprising at least one heat exchanger for vaporizing the liquid alternative fuel;
  a second pump positioned to direct the vapor alternative fuel through a second conduit to the combustor; and
  a second flow control device coupled to the second conduit for controlling a flow rate of the vapor alternative fuel therethrough,
 wherein the combustor is configured to achieve ignition using the liquid alternative fuel supplied from the liquid supply system,
 wherein the first flow control device and the second flow control device are controllable such that, after ignition, the first flow control device reduces a volume of the liquid alternative fuel delivered to the combustor while the second flow control device increases a volume of the vapor alternative fuel delivered to the combustor, and
 wherein the combustor is configured to be operated, subsequent to ignition, by combusting only vapor alternative fuel channeled from the vapor supply system.

10. The power generation system of claim 9, wherein the alternative fuel comprises ethanol.

11. The power generation system of claim 9, wherein the power generation system comprises a gas turbine engine.

12. The power generation system of claim 11, wherein the combustor is one of a plurality of combustors and the fuel nozzle is one of a plurality of fuel nozzles, wherein the plurality of fuel nozzles inject the atomized liquid alternative fuel into the plurality of combustors.

13. The power generation system of claim 9, wherein the vaporization system further comprises a heat recovery steam generator coupled to receive exhaust gases from the combustor, wherein the heat recovery steam generator heats a heat exchange medium and channels the heat exchange medium from the heat recovery steam generator to the at least one heat exchanger to vaporize the liquid alternative fuel.

14. The power generation system of claim 13, wherein the vapor supply system further comprises an inertial separator, wherein the power generation system further comprises a steam pipe extending between the heat recovery steam generator and the inertial separator, wherein steam generated by the heat recovery steam generator is be directed though the steam pipe to preheat the inertial separator.

15. The power generation system of claim 9, wherein the alternative fuel is an alcohol-based fuel.

16. The power generation system of claim 9, wherein the alternative fuel is methanol.

17. The power generation system of claim 9, wherein the alternative fuel is bio-diesel.

18. The power generation system of claim 9, wherein the power generation system comprises:
 an auxiliary boiler for generating steam; and
 a steam pipe extending between the auxiliary boiler and the vapor supply system to enable steam generated by the auxiliary boiler to be directed through the steam pipe to preheat the vapor supply system.

* * * * *